United States Patent [19]

Pazdernik

[11] Patent Number: 4,779,715

[45] Date of Patent: Oct. 25, 1988

[54] LANE DIVIDER

[75] Inventor: Irvan L. Pazdernik, Alexandria, Minn.

[73] Assignee: APV Douglas Machine Corporation, Alexandria, Minn.

[21] Appl. No.: 106,108

[22] Filed: Oct. 7, 1987

[51] Int. Cl.[4] .......... B65G 47/68

[52] U.S. Cl. .......... 198/436; 198/627

[58] Field of Search .......... 198/436, 437, 440, 627

[56] References Cited

U.S. PATENT DOCUMENTS

| | | | |
|---|---|---|---|
| 1,741,616 | 12/1929 | Crady . | |
| 1,824,413 | 9/1931 | Stein | 198/437 |
| 1,871,832 | 8/1932 | Absmeier . | |
| 2,334,384 | 11/1943 | Cohen . | |
| 2,374,429 | 4/1945 | Hayes et al. | 198/627 |
| 2,569,711 | 10/1951 | Foster . | |
| 2,602,534 | 7/1952 | Hartmann . | |
| 2,795,312 | 6/1957 | Howdle | 198/437 |
| 2,940,580 | 6/1960 | Francois | 198/627 |
| 2,991,893 | 7/1961 | Kirsch et al. . | |
| 3,838,763 | 10/1974 | Rooke et al. . | |
| 3,921,786 | 11/1975 | Hejmanowski . | |
| 4,498,576 | 2/1985 | Anderson . | |

*Primary Examiner*—Joseph E. Valenza
*Attorney, Agent, or Firm*—Peterson, Wicks, Nemer & Kamrath

[57] ABSTRACT

A lane divider for automatically dividing a single row of objects into a plurality of rows is shown in its preferred form as including a diverting conveyor having an outfeed end movable between a plurality of lane positions. The diverting conveyor includes belts located on the faces of first and second elongated pivot bars to form an object passage channel. The elongated pivot bars are pivotally mounted in a parallelogram arrangement about fixed axes adjacent the infeed end and about axes adjacent the outfeed end which are reciproated. Opposite point deflection between the belts is minimized by changing the relative length of the drive chain between the drive shafts of the belts in response to the pivoting of the elongated pivot bars by pivotally interrelating the elongated pivot bars to a plate pivotally mounting idler sprockets on opposite sides of one of the drive shafts. Additionally, the pivot axes of the elongated pivot bars are located adjacent to the faces of the elongated pivot bars which are separate from and spaced inwardly of the drive and idler pulleys for the conveyor belts of the elongated pivot bars.

20 Claims, 3 Drawing Sheets

LANE DIVIDER

BACKGROUND

The present invention relates to lane dividers for dividing a single row of a plurality of objects into a plurality of rows of objects.

In the packaging of products, it is often necessary to take a single row of product and divert it into two or more rows for packaging. Thus, a need has arisen for a device for automatically dividing a single row of objects into two or more separate rows of objects which is relatively trouble free without the objects twisting, turning, and/or jamming up or stopping the device and which operates at relatively high rates.

SUMMARY

The present invention solves this need and other problems in the field of lane dividers by providing a pivotable diverting conveyor including first and second continuously carrying members defining an object passage channel. The diverting conveyor is pivotable about its infeed end such that the infeed end is moveable between at least two lane positions. In a first aspect, the speed of the continuously carrying members of the diverting conveyor is interrelated to the pivotable position of the diverting conveyor to minimize opposite point deflection between the continuously carrying members within the object passage channel between the infeed and outfeed ends of the diverting conveyor.

In another aspect of the present invention, the diverting conveyor is formed by first and second elongated pivot bars pivotally mounted in a parallelogram arrangement. To minimize opposite point deflection between the continuously carrying members within the object passage channel between the infeed and outfeed ends of the diverting conveyor, the elongated pivot bars are pivotable about axes which are located adjacent to the faces of the elongated pivot bars upon which the continuously carrying members are supported.

It is thus an object of the present invention to provide a novel lane divider.

It is further an object of the present invention to provide such a novel lane divider which operates at relatively high rates.

It is further an object of the present invention to provide such a novel lane divider which is relatively trouble free.

It is further an object of the present invention to provide such a novel lane divider which reduces the tendency of the object to twist or turn in the diverting conveyor.

It is further an object of the present invention to provide such a novel lane divider having an object passage channel including an infeed end with an introduction approximating square entry corners.

It is further an object of the present invention to provide such a novel lane divider which minimizes opposite point deflection between the continuously carrying members within the object passage channel between the infeed and outfeed ends of the diverting conveyor.

It is further an object of the present invention to provide such a novel lane divider which interrelates the speed of the continuously carrying members and the position of the diverting conveyor.

It is further an object of the present invention to provide such a novel lane divider which pivotally mounts the diverting conveyor in a manner to minimize opposite point deflection between the continuously carrying members within the object passage channel between the infeed and outfeed ends of the diverting conveyor.

It is further an object of the present invention to provide such a novel lane divider which is effective for dividing objects of various types and forms.

It is further an object of the present invention to provide such a novel lane divider which is effective for small objects.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

Figure 1:
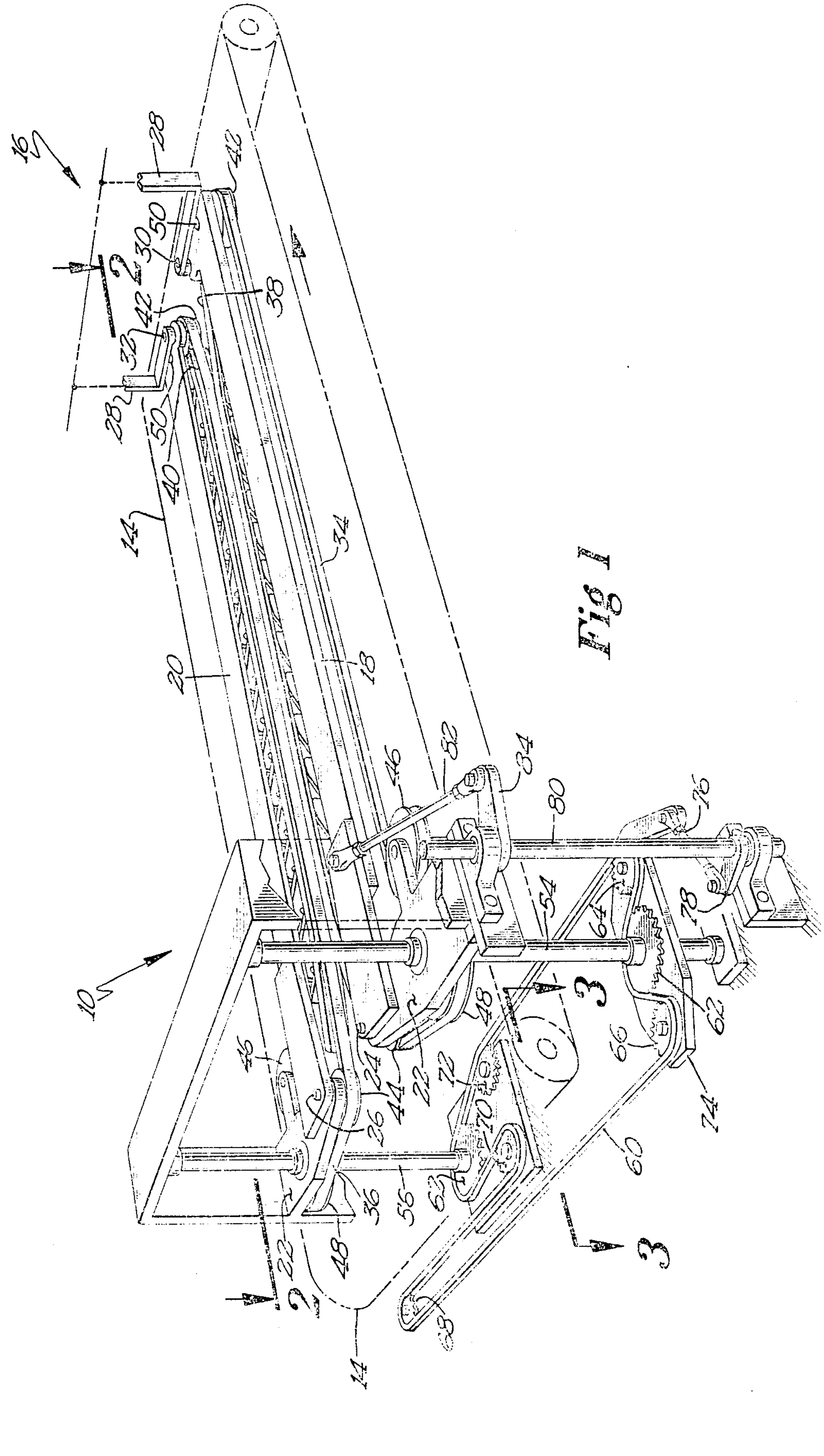
FIG. 1 shows a perspective view of a lane divider according to the most preferred teachings of the present invention, with portions thereof being partially broken away to reveal internal components.
Figure 2:
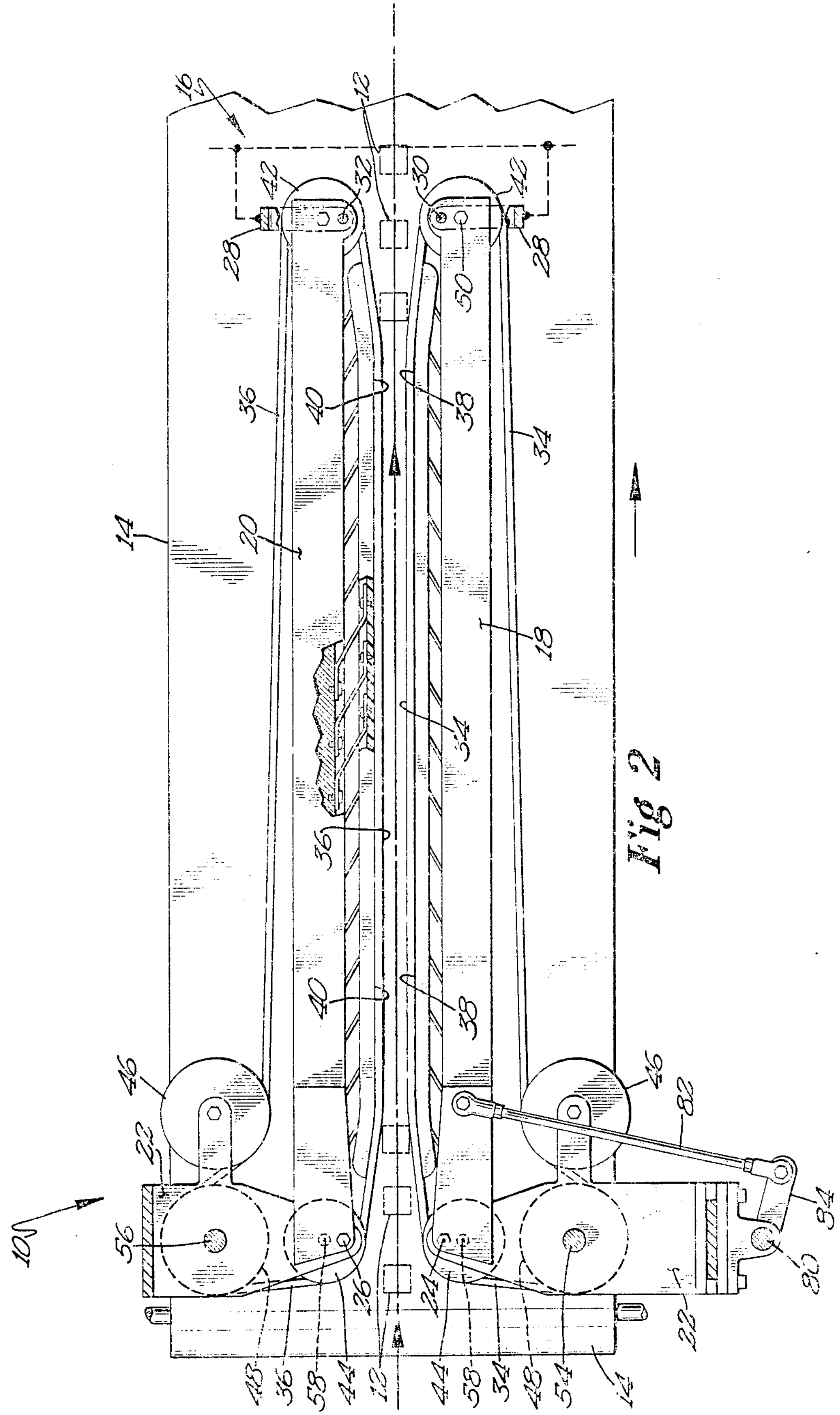
FIG. 2 shows a sectional view of the lane divider of FIG. 1 according to section line 2—2 of FIG. 1.
Figure 3:
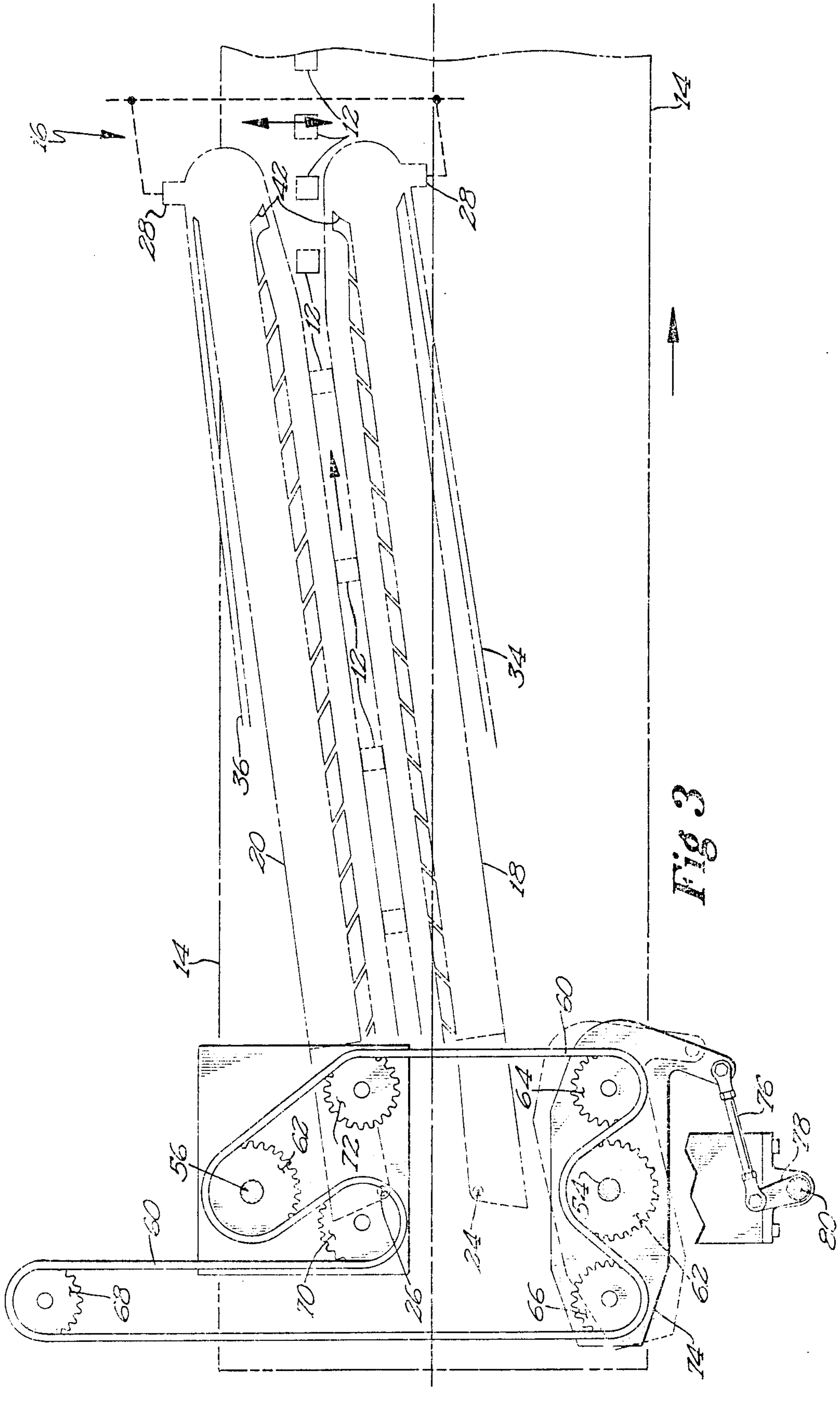
FIG. 3 shows a sectional view of the lane divider of FIG. 1 according to section line 3—3 of FIG. 1.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "top", "bottom", "first", "second", "inner", "outer", and similar terms are used herein, it should be understood that these terms have reference only to the structure shown in the drawings as it would appear to a person viewing the drawings and are utilized only to facilitate describing the invention.

DESCRIPTION

A lane divider according to the most preferred teachings of the present invention is shown in the figures and generally designated 10. Lane divider 10 automatically divides a single row of a plurality of objects 12 delivered by an infeed conveyor or device into two or more separate rows of objects. Objects 12 can be of a variety of types and forms such as boxes or bottles of varying shapes and sizes.

In its most preferred form, lane divider 10 includes a transport conveyor 14 and a diverting conveyor 16. According to the teachings of the present invention, diverting conveyor 16 includes a first elongated pivot bar 18 and a second elongated pivot bar 20. The first, infeed ends of bars 18 and 20 are pivotally mounted to frame projections 22 about fixed, spaced, and parallel axes 24 and 26, respectively. Bars 18 and 20 are pivoted about axes 24 and 26 in a generally parallel manner by reciprocating the second, outfeed ends of bars 18 and 20. In the most preferred form, the second, outfeed ends of bars 18 and 20 are pivotally mounted to a transport mechanism 28, partially shown, about movable, spaced, parallel axes 30 and 32, respectively, with axes 30 and 32 being movable in a movement direction generally parallel to a line extending perpendicularly between axes 24 and 26. Transport mechanism 28 can take a variety of forms such as a reciprocating chain driven by a servomotor. Although movable, axes 30 and 32 have a fixed spacing generally equal to the spacing between axes 24 and 26. The spacing between axes 24 and 30 and between axes 26 and 32 is equal. Thus, it can be appreciated that bars 18 and 20 are pivotally mounted in a parallelogram arrangement.

In the most preferred form, conveyor belts 34 and 36 are provided for continuously carrying objects 12 along the inside faces 38 and 40 of bars 18 and 20, respectively. Faces 38 and 40 may include members for resiliently supporting belts 34 and 36 thereon such as spring loaded slides. In the most preferred form, belts 34 and 36 are carried and driven by idler pulleys 42, 44, and 46 and by drive pulleys 48. First idler pulleys 42 are rotatably mounted to the second ends of bars 18 and 20 about axes 50 which are spaced from and on opposite sides of axes 30 and 32 and direct belts 34 and 36 adjacent faces 38 and 40, respectively.

In the most preferred form, axes 24 and 26 extend through frame projections 22 and are spaced a distance generally for movably capturing and carrying object 12 between belts 34 and 36 of bars 18 and 20. Drive pulleys 48 are rotatably fixed to shafts 54 and 56 rotatably mounted to frame projections 22 which are spaced from and on opposite sides of axes 24 and 26. Idler pulleys 44 are rotatably mounted to frame projections 22 about axes 58 which are spaced from and on opposite sides of axes 24 and 26 and located intermediate axis 24 and shaft 54 and axis 26 and shaft 56 and direct belts 34 and 36 from drive pulleys 48 to a location adjacent faces 38 and 40, respectively. Idler pulleys 46 are rotatably mounted to frame projections 22 and insure that belts 34 and 36 have a sufficient wrap around drive pulleys 48.

Belts 34 and 36 are driven together such as by a chain 60 extending between drive sprockets 62 located on shafts 54 and 56 and around idler sprockets 64, 66, 68, 70, and 72. Idler sprockets 68, 70, and 72 are rotatably mounted about fixed axes. Idler sprockets 64 and 66 are rotatably mounted on opposite sides of shaft 54 on a plate 74 pivotally mounted on shaft 54. Plate 74 is pivotally interrelated or interconnected to bar 18 by a turnbuckle 76 pivotally mounted between plate 74 and a crank arm 78 rotatably fixed to a shaft 80 and by a turn buckle 82 pivotally mounted between bar 18 and a crank arm 84 rotatably fixed to shaft 80. Thus, when bar 18 is pivoted about axis 24, shaft 80 is rotated by crank arm 84 due to the interconnection of bar 18 and crank arm 84 by turnbuckle 82. In turn, when shaft 80 is rotated by crank arm 84, plate 74 is pivoted about shaft 54 due to the interconnection of plate 74 and crank arm 78 by turnbuckle 76. Shaft 54 may be driven by any suitable power source, not shown.

Now that the basic construction of lane divider 10 of the preferred embodiment has been explained, the operation and subtle advantages of lane divider 10 according to the teachings of the present invention can be set forth and appreciated. A single row of objects 12 is delivered by the infeed conveyor and/or by transport conveyor 14 to the infeed end of diverting conveyor 16 for receipt between belts 34 and 36 adjacent axes 24 and 26. Diverting conveyor 16 is pivoted by transport mechanism 28 such that the outfeed end of diverting conveyor 16 is moved from lane to lane such that the single row of objects 12 is moved from a single lane on tranport convenyor 14 to two or more separate rows of objects 12. It can then be realized that transport mechanism 28 can be programmed to regulate the number of objects which are delivered into each lane on transport conveyor 14 such as by counting the gaps between objects 12 utilizing a through-beam sensor.

Lane divider 10 according to the teachings of the present invention is particularly adantageous in the reduction of deflection of corresponding points on belts 34 and 36 resulting from the differences between the speeds of belts 34 and 36 within the object passage channel due to the pivotal movement of diverting conveyor 16. If points on belts 34 and 36 which are opposite to each other at the infeed end of diverting conveyor 16 should shift relative to each other during their travel through diverting conveyor 16 to its outfeed end as they are prone to do because of the pivotable movement of diverting conveyor 16, it is necessary that belts 34 and 36 slip on the sides of object 12 and/or object 12 will twist or turn between belts 34 and 36 possibly stopping and/or jamming diverting conveyor 16 especially when small, square-shaped objects 12 are being divided. Thus, it is clearly advantageous to reduce opposite point deflection in the dividing operation.

Particularly, in the most preferred form of the present invention, axes 24, 26, 30, and 32 of bars 18 and 20 are located adjacent to faces 38 and 40 of bars 18 and 20 and thus to belts 34 and 36. This preferred location minimizes opposite point deflection of belts 34 and 36 as the result of pivotable movement of bars 18 and 20 about axes 24 and 26 by transport mechanism 28. This preferred location of axes 24, 26, 30, and 32 is accomplished in the most preferred form by several, distinctive, constructional features. Specifically, bars 18 and 20 are pivotably mounted about axes 24 and 26 which are separate from axes 50 and shafts 54 and 56. Additionally, axes 24 and 26 are located inwardly of axes 50 and shafts 54 and 56. Thus, the physical size restraints of pulleys 42 and 48 do not determine the spacing between axes 24 and 26 such that axes 24 and 26 can be located adjacent to belts 34 and 36 defining the object passage channel in diverting conveyor 16. Further, the preferred construction of diverting conveyor 16 allows the use of small diameter pulleys 42 such that the infeed end of object passage channel of diverting conveyor 16 closer approximates square corners. Large diameter pulleys form a wedge type introduction which allows the objects to turn, twist, or the like before or during their entry into the object passage channel possibly stopping and/or jamming the diverting conveyor.

Similarly, in the most preferred form of the present invention, the relative travel of the slower of belts 34 and 36 is speeded up responsive to the pivotal movement of diverting conveyor 16. This interrelation minimizes opposite point deflection of belts 34 and 36 as the result of pivotable movement of bars 18 and 20 about axes 24 and 26 by transport mechanism 28. This interrelation of the speed of belts 34 and 36 and the pivotal location of diverting conveyor 16 is accomplished in the most preferred form by shifting plate 74 carrying idler sprockets 64 and 66 by pivoting plate 74 about shaft 54 in response to the pivoting of diverting conveyor 16 through the interconnection by shaft 80, crank arms 78 and 84, and turnbuckles 76 and 82. Specifically, pivotal movement of plate 74 about shaft 54 in a clockwise direction in the figures causes the relative length of chain 60 between drive sprockets 62 to be advanced causing shaft 56 to be rotated relative to shaft 54 and advancing or speeding up the travel of belt 36 relative to belt 34. Conversely, pivotal movement of plate 74 about shaft 54 in a counter-clockwise direction in the figures causes the relative length of chain 60 between drive sprockets 62 to be retracted causing shaft 56 to be rotated relative to shaft 54 and retracting or slowing down the travel of belt 36 relative to belt 34. It of course should be appreciated that shafts 54 and 56 are simultaneously being rotated by their interconnection by chain 60 and by the driving of shaft 54 in addition to the relative rotation between shafts 54 and 56 caused by pivoting idler sprockets 64 and 66 about shaft 54.

Now that the basic teachings of the present invention have been explained, many extensions and variations will be obvious to one having ordinary skill in the art. For example, although in its most preferred form, lane divider 10 incorporates the distinctive, opposite point deflection minimization features of the pivotal axes locations and the belt speed and diverting conveyor interrelation in a single device which is believed to be particularly advantageous, it can be appreciated that these opposite point deflection minimization features can be utilized separately and/or with other opposite point deflection minimization features.

Similarly, the type, construction, and location of plate 74, turnbuckles 76 and 82, crank arm 78 and 84, and shaft 80 are exemplary and may take other types, constructions, and locations according to the teachings of the present invention. For example, turnbuckle 76 may be pivotally mounted to bar 20 according to the teachings of the present invention.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Device for automatically dividing a single row of a plurality of objects into two or more separate rows of objects comprising, in combination: a first elongated pivot bar having a face; a second elongated pivot bar having a face; first means provided on the face of the first elongated pivot bar for continuously carrying the object along the face of the first elongated pivot bar; second means provided on the face of the second elongated pivot bar for continuously carrying the object along the face of the second elongated pivot bar; means for pivotally mounting the first and second elongated pivot bars in a parallelogram arrangement, with the first elongated pivot bar being pivotally mounted about a first, fixed axis located adjacent to the face of the first elongated pivot bar and a second, movable axis located adjacent to the face of the first elongated pivot bar, with the second elongated pivot bar being pivotally mounted about a third, fixed axis located adjacent to the face of the second elongated pivot bar and about a fourth, movable axis located adjacent to the face of the second elongated pivot bar, with the first and third axes being parallel and spaced a distance generally for movably capturing the object between the continuously carrying means of the first and second elongated pivot bars, with the second and fourth axes being parallel and spaced a distance generally equal to the spacing distance of the first and third axes, with the spacing between the first and second axes and between the third and fourth axes being equal; and means for reciprocating the second and fourth axes of the first and second elongated pivot bars in a movement direction generally parallel to a line extending perpendicularly between the first and third axes for pivoting the first and second elongated pivot bars about the first and third axes between at least a first lane position and a second lane position, with the faces of the first and second elongated pivot bars being generally parallel.

2. The device of claim 1 further comprising, in combination: means for interrelating the speed of the first and second continuously carrying means and the pivotal lane position of the first and second elongated pivot bars for minimizing opposite point deflection between the first and second continuously carrying means.

3. The device of claim 2 wherein the first and second continuously carrying means comprises, in combination: first and second conveyor belts, with the first and second conveyor belts being driven by first and second drive shafts, with the first and second drive shafts being rotatably interconnected together by a drive chain; and wherein the interrelating means comprises, in combination: means for changing the relative length of the drive chain between the first and second drive shafts in response to the pivoting of the first and second elongated pivot bars.

4. The device of claim 3 wherein the drive chain length changing means comprises, in combination: a plate pivotably mounted on the first drive shaft; first and second idler sprockets rotatably mounted on the plate on opposite sides of the first drive shaft, with the drive chain extending around the first idler sprocket to the first drive shaft and to the second idler sprocket; and means for pivotally interconnectiong the plate with the first and second elongated pivot bars.

5. The device of claim 4 wherein the pivotally interconnecting means comprises, in combination: a rotatable shaft; a first crank arm rotatably fixed to the rotatable shaft; means for pivotally interrelating one of the first and second elongated pivot bars and the first crank arm; a second crank arm rotatably fixed to the rotatable shaft; and means for pivotally interrelating the second crank arm and the plate.

6. The device of claim 1 wherein the first and second elongated pivot bars have an infeed end and an outfeed end; and wherein the first and second continuously carrying means comprises, in combination: first and second conveyor belts; first and second pulleys rotatably mounted to the first and second elongated pivot bars adjacent the infeed end for directing the conveyor belts adjacent the faces of the elongated pivot bars; third and fourth pulleys rotatably mounted to the first and second elongated pivot bars adjacent to the outfeed end for directing the conveyor belts adjacent the faces of the elongated pivot bars; and means for driving the first and second conveyor belts.

7. The device of claim 6 wherein the first, second, third, and fourth pulleys are rotatably mounted about axes, with the axes of the first and second pulleys being parallel to and located on the opposite sides of the first and third axes of the first and second elongated pivot bars, with the axes of the third and fourth pulleys being parallel to and located on the opposite sides of the second and fourth axes of the first and second elongated pivot bars.

8. The device of claim 7 wherein the driving means comprises, in combination: first and second drive pulleys rotatably mounted about axes; and means for rotating the drive pulleys, with the axes of the drive pulleys being parallel to and located on the opposite sides of the axes of the first and second pulleys.

9. The device of claim 8 wherein the drive pulleys have a diameter; and wherein the first and second pulleys have a diameter smaller than the diameter of the drive pulleys to allow the conveyor belts to approximate a square corner at the infeed end of the first and second elongated pivot bars.

10. The device of claim 8 further comprising, in combination: an idler pulley abutting with the first conveyor belt located between the first drive pulley and the third pulley and an idler pulley abutting with the second conveyor belt located between the second drive pulley and the fourth pulley to increase the angle of wrap of the conveyor belts around the drive pulleys.

11. The device of claim 8 further comprising, in combination: means for interrelating the speed of the first and second continuously carrying means and the lane position of the first and second elongated pivot bars for minimizing opposite point deflection between the first and second continuously carrying means.

12. The device of claim 11 wherein the means for rotating the drive pulleys comprises, in combination: a drive chain rotatably connecting the first and second drive pulleys; and wherein the interrelating means comprises, in combination: means for changing the relative length of the drive chain between the first and second drive pulleys in response to the pivoting of the first and second elongated pivot bars.

13. The device of claim 12 wherein the drive chain length changing means comprises, in combination: a plate pivotably mounted on the axis of the first drive pulley; first and second idler sprockets rotatably mounted on the plate on opposite sides of the axis of the first drive pulley; and means for pivotally interconnecting the plate with the first and second elongated pivot bars.

14. The device of claim 13 wherein the pivotally interconnecting means comprises, in combination: a rotatable shaft; a first crank arm rotatably fixed to the rotatable shaft; means for pivotally interrelating one of the first and second elongated pivot bars and the first crank arm; a second crank arm rotatably fixed to the rotatable shaft; and means for pivotally interrelating the second crank arm and the plate.

15. Device for automatically dividing a single row of a plurality of objects into two or more separate rows of objects comprising, in combination: a diverting conveyor having an infeed end, an object passage channel, and an outfeed end, with the object passage channel having a first face and a second face; first means provided on the first face of the object passage channel for continuously carrying the object along the first face within the object passage channel; second means provided on the second face of the object passage channel for continuously carrying the object along the second face within the object passage channel; means for pivotally mounting the diverting conveyor adjacent to the infeed end between at least a first lane position and a second lane position; means for reciprocating the outfeed end of the object passage channel for pivoting the object passage channel between the first lane position and the second lane position; and means for interrelating the speed of the continuously carrying means and the lane position of the diverting conveyor for minimizing opposite point deflection between the first and second continuously carrying means within the object passage channel between the infeed end and the outfeed end of the diverting conveyor.

16. The device of claim 15 wherein the first and second continuously carrying means comprises, in combination: first and second conveyor belts, with the first and second conveyor belts being driven by first and second drive shafts, with the first and second drive shafts being rotatably interconnected together by a drive chain; and wherein the interrelating means comprises, in combination: means for changing the relative length of the drive chain between the first and second drive shafts in response to the pivoting of the first and second elongated pivot bars.

17. The device of claim 16 wherein the drive chain length changing means comprises, in combination: a plate pivotably mounted on the first drive shaft; first and second idler sprockets rotatably mounted on the plate on opposite sides of the first drive shaft, with the drive chain extending around the first idler sprocket to the first drive shaft and to the second idler sprocket; and means for pivotally interconnectiong the plate with the first and second elongated pivot bars.

18. The device of claim 17 wherein the pivotally interconnecting means comprises, in combination: a rotatable shaft; a first crank arm rotatably fixed to the rotatable shaft; means for pivotally interrelating one of the first and second elongated pivot bars and the first crank arm; a second crank arm rotatably fixed to the rotatable shaft; and means for pivotally interrelating the second crank arm and the plate.

19. The device of claim 18 further comprising, in combination: first and second pulleys mounted to the diverting conveyor adjacent the infeed end and on opposite sides of the object passage channel; third and fourth pulleys mounted to the diverting conveyor adjacent the outfeed end and on opposite sides of the object passage channel; and first and second drive pulleys rotatably fixed to the first and second drive shafts, with the drive shafts being on opposite sides of the first and second pulleys.

20. The device of claim 19 wherein the drive pulleys have a diameter; and wherein the first and second pulleys have a diameter smaller than the diameter of the drive pulleys to allow the conveyor belts to approximate a square corner at the infeed end of the first and second elongated pivot bars.

* * * * *